United States Patent
Gao (10) Patent No.: US 9,736,015 B2
(45) Date of Patent: Aug. 15, 2017

(54) METHOD AND DEVICE FOR HANDLING RADIO LINK FAILURE

(71) Applicant: CHINA ACADEMY OF TELECOMMUNICATIONS TECHNOLOGY, Beijing (CN)

(72) Inventor: Zhuo Gao, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 208 days.

(21) Appl. No.: 14/053,458

(22) Filed: Oct. 14, 2013

(65) Prior Publication Data

US 2014/0036659 A1 Feb. 6, 2014

Related U.S. Application Data

(63) Continuation of application No. PCT/CN2012/073136, filed on Mar. 27, 2012.

(30) Foreign Application Priority Data

Apr. 13, 2011 (CN) .......................... 2011 1 0092360

(51) Int. Cl.
*H04L 12/24* (2006.01)
*H04W 24/04* (2009.01)
(Continued)

(52) U.S. Cl.
CPC ........ *H04L 41/0654* (2013.01); *H04L 1/0006* (2013.01); *H04W 24/04* (2013.01);
(Continued)

(58) Field of Classification Search
None
See application file for complete search history.

(56) References Cited

U.S. PATENT DOCUMENTS 5,517,674 A * 5/1996 Rune .............................. 455/437
7,158,790 B1 1/2007 Elliott
(Continued)

FOREIGN PATENT DOCUMENTS

| CN | 101128002 A | 2/2008 |
|----|-------------|--------|
| CN | 101179825 A | 5/2008 |

(Continued)

OTHER PUBLICATIONS

International Search Report for PCT/CN2012/073136 dated Jul. 5, 2012.
(Continued)

*Primary Examiner* — Tejis Daya
(74) *Attorney, Agent, or Firm* — Marshall, Gerstein & Borun LLP (57) ABSTRACT

A method and device for handling radio link failure is disclosed. The method is as follows. A device at network side requests a terminal device to send an uplink signal according to a predefined first period, and detects first signal quality. if the device at the network side determines for continuous M1 times that the first signal quality is lower than a predefined first threshold, the device at the network side requests the terminal device to send the uplink signal according to a predefined second period, and detecting second signal quality, wherein M1 is a predefined first value. When determining according to the second signal quality that restoration of a radio link of the terminal device is failed, the device at the network side releases network resources corresponding to the radio link of the terminal device. The predefined second period is larger than the predefined first period.

18 Claims, 4 Drawing Sheets

(51) Int. Cl.
*H04W 28/18* (2009.01)
*H04W 76/02* (2009.01)
*H04L 1/00* (2006.01)
*H04W 24/08* (2009.01)
*H04W 74/00* (2009.01)

(52) U.S. Cl.
CPC ......... *H04W 28/18* (2013.01); *H04W 76/027* (2013.01); *H04W 24/08* (2013.01); *H04W 74/002* (2013.01)

(56) References Cited

U.S. PATENT DOCUMENTS

| | | | | |
|---|---|---|---|---|
| 8,060,098 | B2* | 11/2011 | Yang | H04W 36/0055 370/331 |
| 2002/0071390 | A1* | 6/2002 | Reeves | H04Q 11/0478 370/235 |
| 2005/0255870 | A1 | 11/2005 | Chang et al. | |
| 2008/0008212 | A1* | 1/2008 | Wang et al. | 370/503 |
| 2008/0049710 | A1* | 2/2008 | Zeira | H04W 52/08 370/345 |
| 2008/0287091 | A1* | 11/2008 | Suzuki et al. | 455/343.4 |
| 2008/0287149 | A1* | 11/2008 | Womack et al. | 455/466 |
| 2009/0239566 | A1* | 9/2009 | Pelletier et al. | 455/517 |
| 2010/0110901 | A1 | 5/2010 | Wong et al. | |
| 2010/0112956 | A1* | 5/2010 | Jeong | H04B 17/309 455/67.11 |
| 2010/0188982 | A1* | 7/2010 | Kato et al. | 370/242 |
| 2010/0195640 | A1* | 8/2010 | Park et al. | 370/350 |
| 2010/0329216 | A1 | 12/2010 | Jen | |
| 2011/0021154 | A1* | 1/2011 | Marinier et al. | 455/67.11 |
| 2011/0183663 | A1* | 7/2011 | Kenehan et al. | 455/423 |
| 2011/0194432 | A1* | 8/2011 | Kato | H04W 74/002 370/252 |
| 2011/0207485 | A1 | 8/2011 | Dimou et al. | |
| 2011/0217973 | A1* | 9/2011 | Sagfors et al. | 455/423 |
| 2011/0292812 | A1* | 12/2011 | Kim | H04B 17/309 370/242 |
| 2012/0014488 | A1* | 1/2012 | Liu et al. | 375/359 |
| 2012/0069728 | A1* | 3/2012 | Jung et al. | 370/216 |
| 2012/0142336 | A1 | 6/2012 | Van Phan et al. | |
| 2012/0178445 | A1 | 7/2012 | Dalsgaard et al. | |
| 2012/0270545 | A1 | 10/2012 | Zhao et al. | |

FOREIGN PATENT DOCUMENTS

| | | | |
|---|---|---|---|
| CN | 101212775 A | 7/2008 | |
| CN | 102143522 A | 8/2011 | |
| WO | WO-2009/058764 A1 | 5/2009 | |
| WO | WO 2009154102 A1 * | 12/2009 | .......... H04W 74/002 |

OTHER PUBLICATIONS

3rd Generation Partnership Project; Technical Specification Group Radio Access Network; Physical layer procedures (FDD) (Release 8) (Dec. 2010).

Office Action from Chinese Application No. 20111100923605 dated Feb. 5, 2013.

Office Action from Chinese Application No. 2011109923605 dated Oct. 14, 2013.

Search Report from European Application No. 12771802.1 dated Oct. 6, 2014.

* cited by examiner (Prior Art)

Figure 1

(Prior Art)

METHOD AND DEVICE FOR HANDLING RADIO LINK FAILURE

This is a continuation of International Patent Application No. PCT/CN2012/073136 filed Mar. 27, 2012, which claims the benefit of priority Chinese Patent Application, No. 201110092360.5, entitled "method and device for handling radio link failure" and filed on Apr. 13, 2011, the entire content of which is hereby incorporated by reference.

FIELD OF THE INVENTION

The present disclosure relates to communication technologies, and to a method and device for handling radio link failure.

BACKGROUND OF THE INVENTION

Figure 1:
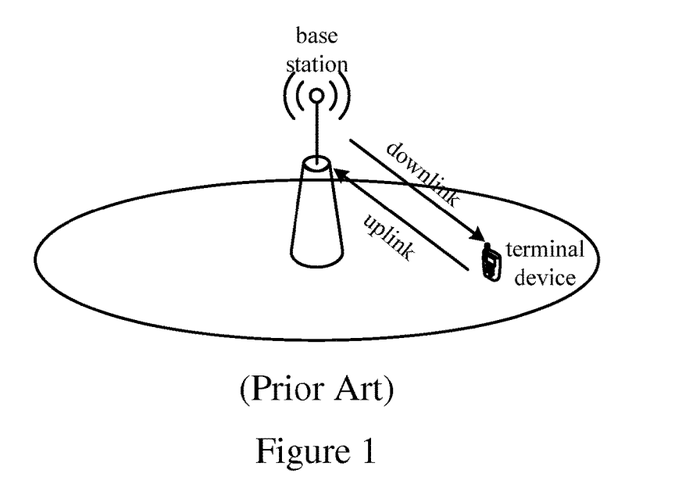
FIG. 1 is a schematic diagram illustrating a cellular mobile communication system according to an example.

In a cellular mobile communication system shown in FIG. 1, communication links at radio side include uplinks and downlinks. Through the downlinks, a base station may send data to terminal devices, and through the uplinks, the terminal devices may send data to the base station. Taking a Long Term Evolution (LTE) system as an example, the communication between a terminal device and a device at network side is illustrated hereinafter, and the state detection of radio links between the terminal device and the device at the network side is also illustrated hereinafter.

In the LTE system, when the terminal device initiates a service, the terminal device establishes a connection with the device at the network side firstly. Afterwards, the terminal device sends uplink data on uplink radio resources, and receives downlink data on downlink radio resources. The uplink radio resources and the downlink radio resources are both assigned by the device at the network side. When the terminal device terminates the service, the device at the network side releases the connection established by the terminal device, and reclaims the resources that are previously assigned and used during the communication.

When the terminal device moves or the communication environment changes, the quality of communication links between the terminal device and the device at the network side changes. In order to ensure the acceptable communication of the terminal device, the quality of signals received and sent by the terminal device should be higher than a threshold. Accordingly, in the LTE system a common pilot signal is configured, which is used to detect the quality of downlink signals in real time by the terminal device.

A process of detecting a radio link by the terminal device is as follows. Through constants N310 and N311 as well as a timer T310, the terminal device detects whether the radio link is failed. When the terminal device is in a connection state, the physical layer of the terminal device continuously detects the quality of downlink channel of serving cell. When determining that the quality of downlink channel is lower than a threshold, the physical layer of the terminal device sends an "out-of-sync" instruction to a high layer of the terminal device. When determining that the quality of downlink channel is higher than the threshold, the physical layer of the terminal device sends an "in-sync" instruction to the high layer of the terminal device.

Figure 2:
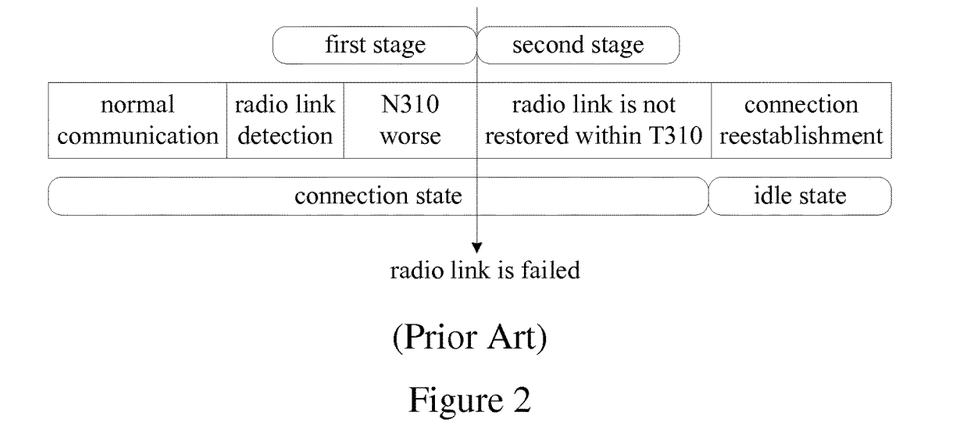
FIG. 2 is a schematic diagram illustrating a process of detecting a radio link according to an example.

As shown in FIG. 2, when receiving N310 continuous "out-of-sync" instructions, the high layer of the terminal device determines that the radio link is failed temporarily, and starts the timer T310. T310 specifies a maximum time of waiting for the restoration of the radio link. When the high layer of the terminal device receives N311 continuous "in-sync" instructions and the timer T310 has been started, the high layer of the terminal device determines that the radio link has been restored, and stops the timer T310. If the timer T310 expires, it is indicated that the radio link has been failed, and the terminal device initiates a connection reestablishment process to restore the radio link. If the radio link has not been restored, the terminal device enters the idle state.

It should be noted that, when the physical layer of the terminal device determines that the signal quality of the radio link is lower than the threshold and sends the "out-of-sync" instruction to the high layer of the terminal device, the terminal device has been unable to receive or send data normally. At this time, if the device at the network side still assigns uplink or downlink resources to the terminal device, these resources may be wasted.

Accordingly, the device at the network side needs to detect the signal quality of radio link of the terminal device. When determining that the signal quality of radio link of the terminal device is lower than the threshold, the device at the network side does not schedule the terminal device any more before the signal quality of radio link is restored. At present, the terminal device is usually configured with periodical uplink resources, and the signal quality of the periodical uplink resources is detected to determine whether the radio link of the terminal device is normal.

The inventor finds following problems in the prior art.

In the prior art, the device at the network side configures the periodical uplink resources and detects the signal quality of the periodical uplink resources to determine whether the radio link of the terminal device is failed. However, in an actual system, it is because of the limit of available resources that the periodical uplink resources may not be configured to each terminal device being in the connection state. Or, even if the periodical uplink resources are configured to each terminal device being in the connection state, the periodical uplink resources configured to a certain terminal device may be released if the terminal device has not received and sent data for a long time and thus enters an uplink desynchronization state. As can be seen, a method for effectively detecting the signal quality of radio link of the terminal device has not been provided in the prior art.

SUMMARY OF THE INVENTION

Examples of the present disclosure provide a method and device for handling radio link failure, thereby effectively detecting the signal quality of radio link of a terminal device.

The method for handling radio link failure includes:
requesting, by a device at network side, a terminal device to send an uplink signal according to a predefined first period, and detecting first signal quality; and
if the device at the network side determines for continuous M1 times that the first signal quality is lower than a predefined first threshold, requesting the terminal device to send the uplink signal according to a predefined second period, and detecting second signal quality, wherein M1 is a predefined first value; when determining according to the second signal quality that restoration of a radio link of the terminal device is failed, releasing network resources corresponding to the radio link of the terminal device.

A device for handling radio link failure includes
a first handling module, configured to request a terminal device to send an uplink signal according to a predefined first period, and detect first signal quality;
a second handling module, configured to, if the first handling module determines for continuous M1 times that the first signal quality is lower than a predefined first threshold, request the terminal device to send the uplink signal according to a predefined second period, and detect second signal quality, wherein M1 is a predefined first value; and a third handling module is configured to, when determining according to the second signal quality that restoration of a radio link of the terminal device is failed, release network resources corresponding to the radio link of the terminal device.

The examples of the present disclosure have following advantages.

The device at the network side initiatively requests the terminal device to send the uplink signal and detects the signal quality, thereby accurately determining the state of radio link of the terminal device, effectively avoiding wrong operations caused by wrong determination and improving system reliability.

DETAILED DESCRIPTION OF THE INVENTION

In a mobile communication system, it is usually specified that terminal devices detect radio links. When a terminal device determines that a radio link is failed and tries to reconnect to a device at network side, but the device at the network side has not found the failure of the radio link, the device at the network side may still schedule the terminal device, and thus radio resources may be wasted. Accordingly, examples of the present disclosure provide a method and device for handling radio link failure. In the method and device, the state of radio link of the terminal device is detected by the device at the network side, thereby avoiding invalid scheduling caused by the failure of the radio link and improving the utilization of system resources.

The solution of the present disclosure is described clearly hereinafter with reference to the accompanying drawings. Obviously, the described examples are only partial examples of the present disclosure, but are not all examples. According to the examples of the present disclosure, those skilled in the art can obtain other examples without creative labor, which belong to the protection scope of the present disclosure.

Figure 3:
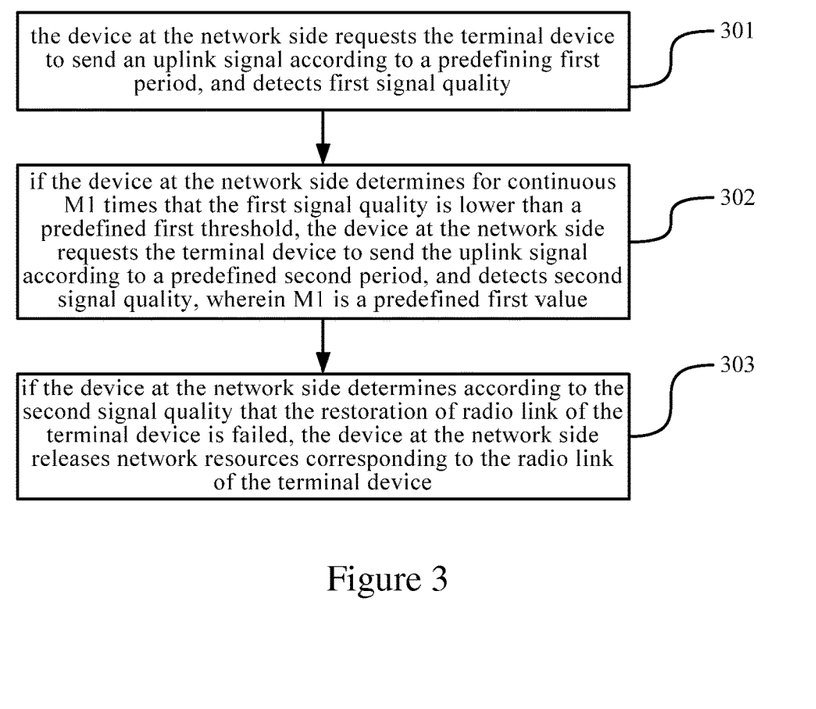
FIG. 3 is a schematic flowchart illustrating a method for handling radio link failure according to an example of the present disclosure.

A method for handling radio link failure is provided according to an example of the present disclosure, so as to detect the state of radio link of a terminal device. In an example, a device at network side may detect the state of radio link of the terminal device in real time. In another example, the device at the network side may also detect the state of radio link of the terminal device through a triggering mode. For instance, the device at the network side cannot be triggered to detect the state of radio link of the terminal device unless the device at the network side is to receive or send data. As shown in FIG. 3, the method includes following blocks.

At block 301, the device at the network side requests the terminal device to send an uplink signal according to a predefining first period, and detects first signal quality. For example, the predefined first period is T1.

In an example, the device at the network side may detect whether the terminal device is in an uplink synchronization state, and requests the terminal device to send the uplink signal according to the predefined first period when the terminal device is not in the uplink synchronization state. In another example, the device at the network side may detect whether the terminal device is configured with periodical uplink resources, and requests the terminal device to send the uplink signal according to the predefined first period when the terminal device is not configured with the periodical uplink resources. The periodical uplink resources include, but are not limited to, an uplink Sounding Reference Signal (SRS) and dedicated uplink resources used by the terminal device to send downlink channel quality information. In another example, the device at the network side may detect the signal quality of the periodical uplink resources of the terminal device, and requests the terminal device to send the uplink signal according to the predefined first period if the device at the network side determines for continuous N1 times that the signal quality of the periodical uplink resources is lower than a predefined third threshold, wherein N1 is a predefined third value. In another example, the device at the network side may detect whether the terminal device is in the uplink synchronization state, detect whether the terminal device is configured with the periodical uplink resources when the terminal device is in the uplink synchronization state, and detect the signal quality of the periodical uplink resources of the terminal device when the terminal device is configured with the periodical uplink resources. When the terminal device is not in the uplink synchronization state, or when the terminal device is not configured with the periodical uplink resources, or when the device at the network side determines for continuous N1 times that the signal quality of the periodical uplink resources is lower than the predefined third threshold, the device at the network side requests the terminal device to send the uplink signal according to the predefined first period.

At block 302, if the device at the network side determines for continuous M1 times that the first signal quality is lower than a predefined first threshold, the device at the network side requests the terminal device to send the uplink signal according to a predefined second period, and detects second signal quality, wherein M1 is a predefined first value. For example, the predefined second period is T2. In an example, the predefined second period may be larger than the predefined first period.

In the example, if the device at the network side determines for continuous M1 times that the first signal quality is lower than the predefined first threshold, the device at the network side determines that the radio link of the terminal device is abnormal, and waits for the restoration of the radio link of the terminal device. During the period of waiting for the restoration of the radio link of the terminal device, the device at the network side requests the terminal device to send the uplink signal according to the predefined second period T2, and detects the second signal quality, so as to determine whether the radio link of the terminal device has been restored. Because the device at the network side has preliminarily determined that the radio link of the terminal device is abnormal, it is not required to detect the radio link of the terminal device frequently, and thus the predefined second period may be larger than the predefined first period.

In the example of the present disclosure, if the device at the network side determines for continuous M1 times that the first signal quality is lower than the predefined first threshold, the device at the network side assigns resources and signaling to the terminal device, wherein the resources is configured to determine the state of the radio link of the terminal device and the signaling is configured to restore connection of the terminal device. When determining that the first signal quality is lower than the predefined first threshold, the device at the network side determines that the radio link of the terminal device is abnormal. During the period of waiting for the restoration of the radio link of the terminal device, the device at the network side does not assign any resources except the resources for determining the state of the radio link of the terminal device and necessary signaling, thereby avoiding resources waste.

In the LTE system, Discontinuous Reception (DRX) and measurement gap are introduced. The DRX may save the energy of the terminal device, and the measurement gap may be used for inter-frequency or inter-system measurement. In the LTE system, it is specified that the terminal device does not send any uplink signal during a DRX dormant period and the measurement period of the measurement gap. Accordingly, in the example of the present disclosure, detection results obtained in the DRX dormant period and the measurement period of the measurement gap should be ignored. That is, the uplink signal quality should be detected when the terminal device is allowed to send the uplink signal.

At block 303, if the device at the network side determines according to the second signal quality that the restoration of radio link of the terminal device is failed, the device at the network side releases network resources corresponding to the radio link of the terminal device. That is, the device at the network side deletes the radio link of the terminal device, and reclaims the network resources assigned to the terminal device.

The restoration of radio link of the terminal device being failed includes that the restoration of radio link of the terminal device is unsuccessful. The restoration of radio link of the terminal device being successful is as follows. If the device at the network side determines for continuous M2 times that the second signal quality is higher than a predefined second threshold, the restoration of radio link of the terminal device is successful, wherein M2 is a predefined second value. Or, the restoration of radio link of the terminal device is successful when the device at the network side receives a connection reestablishment message from the terminal device and a connection has been reestablished successfully.

If the device at the network side determines according to the second signal quality that the restoration of radio link of the terminal device is successful, the device at the network side performs the above detection processes again.

In the example of the present disclosure, the process of requesting the terminal device to send the uplink signal according to the predefined first period or according to the predefined second period includes, but is not limited to, one or any combination of flowing methods.

The device at the network side assigns a preamble to the terminal device through a non-contention based random access mode, and requests the terminal device to send the preamble on first designated resources. At this time, detecting the first signal quality includes detecting whether the terminal device has sent the preamble on the first designated resources.

The device at the network side schedules the terminal device to send downlink Channel Quality Information (CQI), and requests the terminal device to send the CQI on second designated resources. At this time, the process of detecting the first signal quality includes detecting whether the terminal device has sent the CQI on the second designated resources. The terminal device may send the CQI on the designated resources only if the terminal device is in the synchronization state.

The device at the network side assigns downlink resources to the terminal device, and requests the terminal device to send Acknowledgement (ACK)/Negative Acknowledgement (NACK) on uplink resources corresponding to the assigned downlink resources. At this time, the process of detecting the first signal quality includes detecting whether the terminal device has sent the ACK/NACK on the uplink resources corresponding to the assigned downlink resources. The terminal device may send the ACK/NACK on the uplink resources corresponding to the assigned downlink resources only if the terminal device is in the synchronization state.

Figure 4:
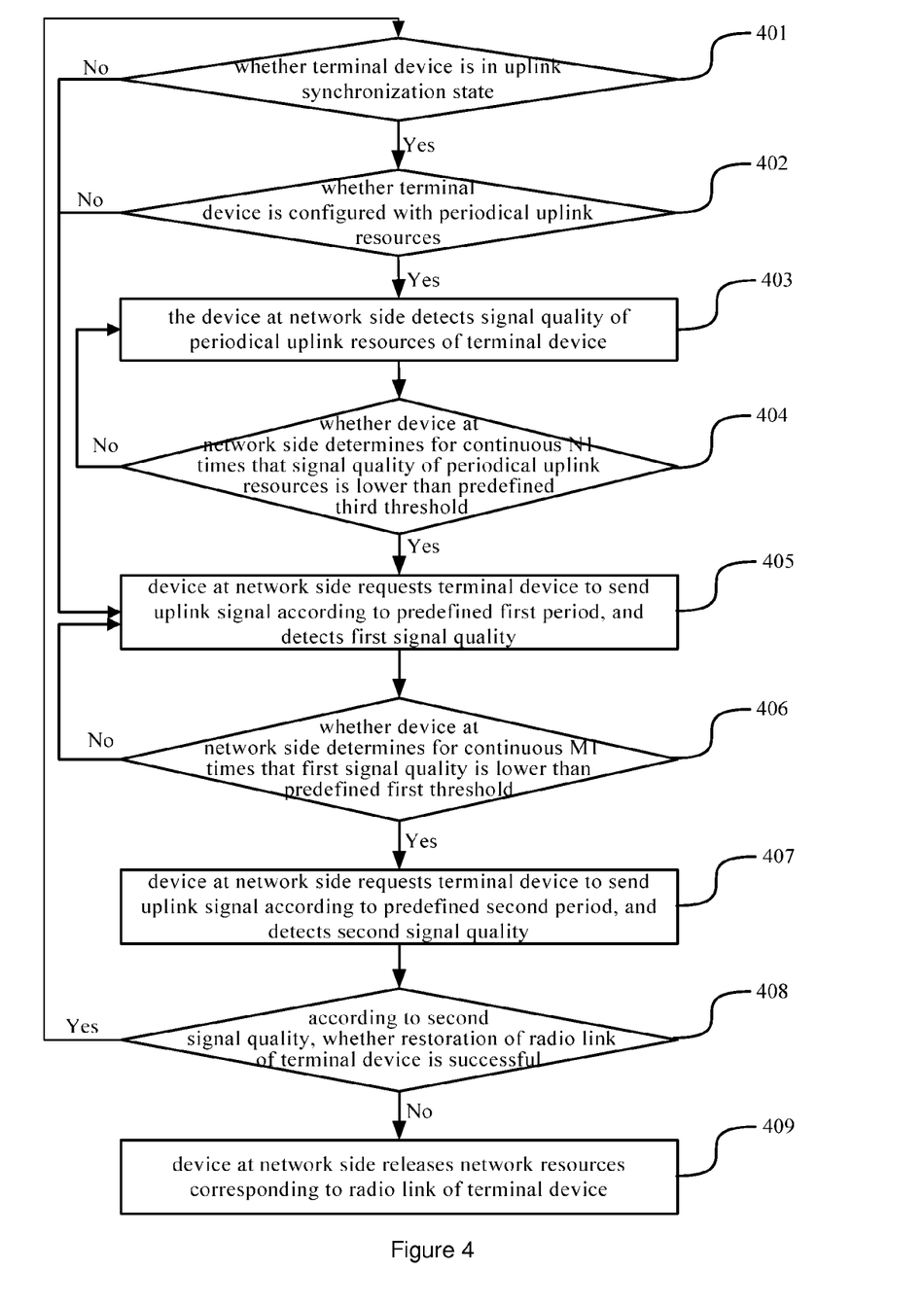
FIG. 4 is a schematic flowchart illustrating a method for handling radio link failure according to another example of the present disclosure.

A method for handling radio link failure is provided according to another example of the disclosure. As shown in FIG. 4, the method includes following blocks.

At block 401, a device at network side determines whether a terminal device is in an uplink synchronization state. If the terminal device is in the uplink synchronization state, block 402 is performed. Otherwise, block 405 is performed.

At block 402, the device at the network side determines whether the terminal device is configured with periodical uplink resources. If the terminal device is configured with the periodical uplink resources, block 403 is performed. Otherwise, block 405 is performed.

The periodical uplink resources may be an uplink SRS or dedicated uplink resources used by the terminal device to send downlink channel quality information. In the LTE system, the dedicated uplink resources are Physical Uplink Control Channel (PUCCH) resources.

At block 403, the device at the network side detects the signal quality of the periodical uplink resources of the terminal device.

At block 404, it is determined whether the device at the network side determines for continuous N1 times that the signal quality of the periodical uplink resources is lower than a predefined third threshold, wherein N1 is a predefined third value. If the device at the network side determines for continuous N1 times that the signal quality of the periodical uplink resources is lower than the predefined third threshold, block 405 is performed. Otherwise, block 403 is performed.

Block 405, the device at the network side requests the terminal device to send an uplink signal according to a predefined first period, and detects first signal quality.

At block 406, it is determined whether the device at the network side determines for continuous M1 times that the first signal quality is lower than a predefined first threshold, wherein M1 is a predefined first value. If the device at the network side determines for continuous M1 times that the first signal quality is lower than the predefined first threshold, block 407 is performed. Otherwise, block 405 is performed.

In the example of the present disclosure, because the device at the network side has detected the uplink signal quality at block 404 before block 405 is performed, M1 may be configured with a smaller value, so as to confirm the state of radio link of the terminal device as fast as possible.

At block 407, the device at the network side requests the terminal device to send the uplink signal according to a predefined second period, and detects second signal quality. For example, the predefined second period is T2. The predefined second period is larger than the predefined first period.

In the example of the present disclosure, when the device at the network side determines that the first signal quality is lower than the predefined first threshold, the device at the network side determines that the radio link of the terminal device is abnormal. During the period of waiting for the restoration of the radio link of the terminal device, the device at the network side does not assign any resources except resources for determining the state of radio link of the terminal device and necessary signaling for restoring the connection of the terminal device, thereby avoiding resources waste.

In the LTE system, DRX and measurement gap are introduced. The DRX may save the energy of the terminal device, and the measurement gap may be used for inter-frequency or inter-system measurement. In the LTE system, it is specified that the terminal device does not send any uplink signal during a DRX dormant period and the measurement period of the measurement gap. Accordingly, in the example of the present disclosure, detection results obtained in the DRX dormant period and the measurement period of the measurement gap should be ignored. That is, the uplink signal quality should be detected when the terminal device is allowed to send the uplink signal.

At block 408, the device at the network side determines according to the second signal quality whether the restoration of radio link of the terminal device is successful. If the restoration of radio link of the terminal device is successful, the device at the network side performs the above detection processes again. Otherwise, block 409 is performed.

At block 409, the device at the network side releases network resources corresponding to the radio link of the terminal device. That is, the device at the network side deletes the radio link of the terminal device, and reclaims the network resources assigned to the terminal device.

The restoration of radio link of the terminal device being successful is as follows. If the device at the network side determines for continuous M2 times that the second signal quality is higher than a predefined second threshold, the restoration of radio link of the terminal device is successful, wherein M2 is a predefined second value. Or, the restoration of radio link of the terminal device is successful when the device at the network side receives a connection reestablishment message from the terminal device and a connection has been reestablished successfully.

Figure 5:
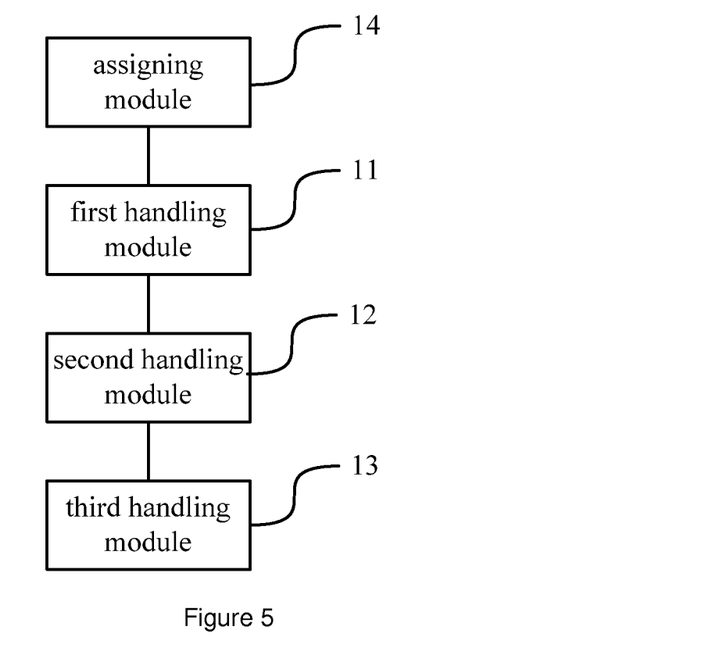
FIG. 5 is a schematic diagram illustrating the structure of a device for handling radio link failure according to an example of the present disclosure.

Based on the above methods, a device at network side is provided according to an example of the present disclosure. As shown in FIG. 5, the device includes following modules.

A first handling module 11 is configured to request a terminal device to send an uplink signal according to a predefined first period, and detect first signal quality.

A second handling module 12 is configured to, if the first handling module 11 determines for continuous M1 times that the first signal quality is lower than a predefined first threshold, request the terminal device to send the uplink signal according to a predefined second period, and detect second signal quality, wherein M1 is a predefined first value. The predefined second period is larger than the predefined first period.

A third handling module 13 is configured to, when determining according to the second signal quality that the restoration of radio link of the terminal device is failed, release network resources corresponding to the radio link of the terminal device.

The process of requesting the terminal device to send the uplink signal includes, but is not limited to, one or any combination of following methods.

The device at the network side assigns a preamble to the terminal device through a non-contention based random access, and requests the terminal device to send the preamble on first designated resources.

The device at the network side schedules the terminal device to send downlink CQI, and requests the terminal device to send the CQI on second designated resources.

The device at the network side assigns downlink resources to the terminal device, and requests the terminal device to send ACK/NACK on uplink resources corresponding to the assigned downlink resources.

The restoration of radio link of the terminal device being failed includes the restoration of radio link of the terminal device is unsuccessful. The restoration of radio link of the terminal device being successful is as follows. If the device at the network side determines for continuous M2 times that the second signal quality is higher than a predefined second threshold, the restoration of radio link of the terminal device is successful, wherein M2 is a predefined second value. Or, the restoration of radio link of the terminal device is successful when the device at the network side receives a connection reestablishment message from the terminal device and a connection has been reestablished successfully.

In an example of the present disclosure, the device further includes an assigning module 14. The assigning module 14 is configured to, if the first handling module 11 determines for continuous M1 times that the first signal quality is lower than the predefined first threshold, assign resources and signaling to the terminal device, wherein the resources are configured to determine the state of the radio link of the terminal device and the signaling is configured to restore the connection of the terminal device.

The first handling module 11 is configured to detect whether the terminal device is in an uplink synchronization state, and request the terminal device to send the uplink signal according to the predefined first period when the terminal device is not in the uplink synchronization state.

The first handling module 11 is configured to detect whether the terminal device is configured with periodical uplink resources, and request the terminal device to send the uplink signal according to the predefined first period when the terminal device is not configured with the periodical uplink resources.

The first handling module 11 is configured to detect the signal quality of the periodical uplink resources of the terminal device. If the first handling module 11 determines for continuous N1 times that the signal quality of the periodical uplink resources is lower than a predefined third threshold, the first handling module 11 requests the terminal device to send the uplink signal according to the predefined first period, wherein N1 is a predefined third value.

The first handling module 11 is configured to detect whether the terminal device is in the uplink synchronization state, detect whether the terminal device is configured with the periodical uplink resources when the terminal device is in the uplink synchronization state, and detect the signal quality of the periodical uplink resources when the terminal device is configured with the periodical uplink resources.

When the terminal device is not in the uplink synchronization state, or when the terminal device is not configured with the periodical uplink resources, or when the first handling module 11 determines for continuous N1 times that the signal quality of the periodical uplink resources is lower than the predefined third threshold, the first handling module 11 requests the terminal device to send the uplink signal according to the predefined first period.

The periodical uplink resources includes, but are not limited to, an uplink SRS and dedicated uplink resources used by the terminal device to send downlink channel quality information.

The modules of the device may be integrated into one body, or may be deployed separately. The above modules may be merged into one module, or may be divided into multiple sub-modules furthermore.

The methods and modules disclosed herein may be realized by software accompanied by general hardware platforms, or by hardware. For instance the methods and modules may be implemented by logic circuitry such as one or more ASICs or integrated circuits or as machine readable instructions stored in a memory and executable by a processor. According to an example, the methods disclosed herein may be in the form of a software product, and the computer software product may be stored in a computer readable storage medium and includes machine-readable instructions to make a computer device (such as a handset, a personal computer, a server or a network device such as a switch or router) perform the methods disclosed herein.

Those skilled in the art can understand that the accompanying drawings are schematic diagrams of some examples, and the modules and flowcharts in the accompanying drawings may be unnecessary for the present disclosure.

Those skilled in the art can understand that the modules of the device may be deployed in the device according to the described examples, or may be deployed in one or more devices different from the device described in the examples. The modules in the above example may be merged into one module, or may be divided into multiple sub-modules furthermore.

The sequence of the above examples is only used for descriptions, which doesn't demonstrate good or better example.

The foregoing is only some examples of the present disclosure, and the protection scope of the present disclosure is not limited to this. Any improvement and replacement which can be made in the technical scope disclosed by the present disclosure by those skilled in the art should be covered in the protection scope of the disclosure.

What is claimed is:

1. A method for handling radio link failure, comprising:
   requesting, by a device at network side, a terminal device to send an uplink signal according to a predefined first period, and detecting first signal quality; and
   if the device at the network side determines for continuous M1 times that the first signal quality is lower than a predefined first threshold, requesting the terminal device to send the uplink signal according to a predefined second period, and detecting second signal quality, wherein M1 is a predefined first value and the predefined second period is larger than the predefined first period; when determining according to the second signal quality that restoration of a radio link of the terminal device is failed, releasing network resources corresponding to the radio link of the terminal device.

2. The method of claim 1, wherein the requesting, by the device at the network side, the terminal device to send the uplink signal according to the predefined first period comprises:
   detecting, by the device at the network side, whether the terminal device is in an uplink synchronization state, and requesting the terminal device to send the uplink signal according to the predefined first period when the terminal device is not in the uplink synchronization state.

3. The method of claim 1, wherein the requesting, by the device at the network side, the terminal device to send the uplink signal according to the predefined first period comprises:
   detecting, by the device at the network side device, whether the terminal device is configured with periodical uplink resources, and requesting the terminal device to send the uplink signal according to the first predefined period when the terminal device is not configured with the periodical uplink resources.

4. The method of claim 1, wherein the requesting, by the device at the network side, the terminal device to send the uplink signal according to the predefined first period comprises:
   detecting, by the device at the network side, signal quality of periodical uplink resources of the terminal device, and requesting the terminal device to send the uplink signal according to the predefined first period when the device at the network side determines for continuous N1 times that the signal quality of the periodical uplink resources is lower than a predefined third threshold, wherein N1 is a predefined third value.

5. The method of claim 1, wherein the requesting, by the device at the network side the terminal device to send the uplink signal according to the predefined first period comprises:
   detecting, by the device at the network side, whether the terminal device is in an uplink synchronization state, detecting whether the terminal device is configured with periodical uplink resources when the terminal device is in the uplink synchronization state, and detecting signal quality of the periodical uplink resources of the terminal device when the terminal device is configured with the periodical uplink resources; and
   when the terminal device is not in the uplink synchronization state, or when the terminal device is not configured with the periodical uplink resources, or when the device at the network side determines for continuous N1 times that the signal quality of the periodical uplink resources is lower than a predefined third threshold, requesting the terminal device to send the uplink signal according to the predefined first period, wherein N1 is a predefined third value.

6. The method of claim 5, wherein the requesting the terminal device to send the uplink signal comprises at least one of:
   assigning, by the device at the network side, a preamble to the terminal device through a non-contention based random access mode, and requesting the terminal device to send the preamble on first designated resources;
   scheduling, by the device at the network side, the terminal device to send downlink Channel Quality Information (CQI), and requesting the terminal device to send the CQI on second designated resources; and assigning, by the device at the network side, downlink resources to the terminal device, and requesting the terminal device to send Acknowledgement (ACK)/Negative Acknowledgement (NACK) on uplink resources corresponding to the assigned downlink resources.

7. The method of claim 5, wherein the restoration of the radio link of the terminal device being failed comprises:
if the device at the network side determines for continuous M2 times that the second signal quality is higher than a predefined second threshold, the restoration of the radio link of the terminal device is successful, wherein M2 is a predefined second value;
otherwise, the restoration of the radio link of the terminal device is failed; or, the restoration of the radio link of the terminal device is successful when the device at the network side receives a connection reestablishment message from the terminal device and a connection has been reestablished successfully.

8. The method of claim 5, when the device at the network side determines for continuous M1 times that the uplink signal quality of the terminal device is lower than the predefined first threshold, further comprising:
assigning, by the device at the network side, resources and signaling to the terminal device, wherein the resources are configured to determine a state of the radio link of the terminal device and the signaling is configured to restore a connection of the terminal device.

9. The method of claim 5, wherein the periodical uplink resources comprises an uplink Sounding Reference Signal (SRS) and dedicated uplink resources used by the terminal device to return downlink channel quality information.

10. A device at network side, comprising:
a processor and a non-transitory storage, wherein the non-transitory storage is configured to store one or more modules to be executed by the processor, and the one or more modules comprise:
a first handling module, configured to request a terminal device to send an uplink signal according to a predefined first period, and detect first signal quality;
a second handling module, configured to, if the first handling module determines for continuous M1 times that the first signal quality is lower than a predefined first threshold, request the terminal device to send the uplink signal according to a predefined second period, and detect second signal quality, wherein M1 is a predefined first value and the predefined second period is larger than the predefined first period; and
a third handling module, configured to, when determining according to the second signal quality that restoration of a radio link of the terminal device is failed, release network resources corresponding to the radio link of the terminal device.

11. The device of claim 10, wherein the first handling module is configured to detect whether the terminal device is in an uplink synchronization state, and request the terminal device to send the uplink signal according to the predefined first period when the terminal device is not in the uplink synchronization state.

12. The device of claim 10, wherein the first handling module is configured to detect whether the terminal device is configured with periodical uplink resources, and request the terminal device to send the uplink signal according to the predefined first period when the terminal device is not configured with the periodical uplink resources.

13. The device of claim 10, wherein the first handling module is configured to detect signal quality of periodical uplink resources of the terminal device, and request the terminal device to send the uplink signal according to the predefined first period when determining for continuous N1 times that signal quality of the periodical uplink resources is lower than a predefined third threshold, wherein N1 is a predefined third value.

14. The device of claim 10, wherein the first handling module is configured to detect whether the terminal device is in an uplink synchronization state, and detect whether the terminal device is configured with periodical uplink resources when the terminal device is in the uplink synchronization state, and detect signal quality of the periodical uplink resources when the terminal device is configured with the periodical uplink resources; and
when the terminal device is not in the uplink synchronization state, or when the terminal device is not configured with the periodical uplink resources, or when determining for continuous N1 times that signal quality of the periodical uplink resources is lower than a predefined third threshold, request the terminal device to send the uplink signal according to the predefined first period, wherein N1 is a predefined third value.

15. The device of claim 14, wherein the first handling module is configured to perform at least one of
assigning a preamble to the terminal device through a non-contention based random access mode, and requesting the terminal device to send the preamble on first designated resources;
scheduling the terminal device to send downlink Channel Quality Information (CQI), and requesting the terminal device to send the CQI on second designated resources; and
assigning downlink resources to the terminal device, and requesting the terminal device to send Acknowledgement (ACK)/Negative Acknowledgement (NACK) on uplink resources corresponding to the assigned downlink resources; and
the second handling module is configured to perform at least one of
assigning a preamble to the terminal device through a non-contention based random access mode, and requesting the terminal device to send the preamble on first designated resources;
scheduling the terminal device to send downlink Channel Quality Information (CQI), and requesting the terminal device to send the CQI on second designated resources; and
assigning downlink resources to the terminal device, and requesting the terminal device to send Acknowledgement (ACK)/Negative Acknowledgement (NACK) on uplink resources corresponding to the assigned downlink resources.

16. The device of claim 14, wherein the restoration of the radio link of the terminal device being failed comprises the restoration of the radio link of the terminal device being unsuccessful;
the restoration of the radio link of the terminal device being successful comprises:
if the third handling module determines for continuous M2 times that the second signal quality is higher than a predefined second threshold, the restoration of the radio link of the terminal device is successful, wherein M2 is a predefined second value; or, the restoration of the radio link of the terminal device is successful when the third handling module receives a connection reestablishment message from the terminal device and a connection has been reestablished successfully.

17. The device of claim 14, further comprising:
an assigning module, configured to assign resources and signaling to the terminal device when determining for continuous M1 times that the first signal quality is lower than the predefined first threshold, wherein the resources are configured to determine a state of the radio link of the terminal device and the signaling is configured to restore a connection of the terminal device.

18. The device of claim 14, wherein the periodical uplink resources comprises an uplink Sounding Reference Symbol (SRS) and dedicated uplink resources used by the terminal device to return downlink channel quality information.

\* \* \* \* \*